United States Patent [19]

Meyer et al.

[11] 4,214,040

[45] Jul. 22, 1980

[54] CROSS-LINKABLE, SATURATED POLYESTER COATING COMPOSITIONS

[75] Inventors: Jacques Meyer, Paris; Daniel Bernelin, Ris Orangis, both of France

[73] Assignee: Rhone-Poulenc Industries, Paris, France

[21] Appl. No.: 893,932

[22] Filed: Apr. 6, 1978

[30] Foreign Application Priority Data

May 23, 1977 [FR] France ................................. 77 15622

[51] Int. Cl.² ...................... C08G 63/70; B32B 15/08; B32B 27/36
[52] U.S. Cl. .................................. 428/458; 260/40 R; 428/482; 525/444; 528/485; 528/488; 528/489
[58] Field of Search ............... 528/273, 304, 305, 309, 528/485, 488, 489; 260/40 R; 525/444; 428/458, 482

[56] References Cited

U.S. PATENT DOCUMENTS

| | | | |
|---|---|---|---|
| 3,502,620 | 3/1970 | Caldwell | 528/273 |
| 3,547,873 | 12/1970 | Wiessermell et al. | 260/40 R |
| 3,842,021 | 10/1974 | Grant et al. | 260/15 |
| 3,868,338 | 2/1975 | Parsons et al. | 260/15 |
| 4,024,111 | 5/1977 | Thomas et al. | 528/273 |

*Primary Examiner*—Walter C. Danison
*Attorney, Agent, or Firm*—Burns, Doane, Swecker & Mathis

[57] ABSTRACT

Curable, saturated polyester resins and cross-linking agents therefor, in association with an at least divalent metal oxide, are useful binders for the powder paints, e.g., those typically applied by electrostatic deposition or fluidized bed spraying.

29 Claims, No Drawings

CROSS-LINKABLE, SATURATED POLYESTER COATING COMPOSITIONS

BACKGROUND OF THE INVENTION

1. Field of the Invention:

This invention relates to compositions of matter comprising a saturated polyester and a cross-linking agent therefor and, more especially, relates to such resinous compositions further including a minor amount of a certain metal oxide and to the use of such compositions as binders for powder paints.

2. Description of the Prior Art:

Compositions of matter useful as binders for various of the powder paints and comprising a cross-linkable saturated polyester resin bearing terminal hydroxyl groups and an anhydride curing agent therefor are known to this art. Compare the U.S. Patent No. 4,024,111 to Thomas et al. These and other known compositions comprising the powdered paints, moreover, typically include a given charge of pigment, with the ratio of the charge to binder varying over wide limits. Also typically included are such additives as spreading or flow control agents [which modify the surface tension of the paint], catalysts, colorants and the like. Preparation of the aforesaid compositions has been readily effected, usually by separately formulating the binder resin and the curing agent, optionally involving admixing and fusing the same together at a temperature lower than that at which curing or interreaction occurs, by next admixing the product of such fusion of the binder components with the pigment charge and any other additives or adjuvants at low, non-curing temperatures, followed by the ultimate grinding or powdering of the resulting mix to any suitable granulometry. The ultimate composition is thence coated onto any suitable substrate, typically a metallic substrate, e.g., by electrostatic deposition or spraying, and, subsequently, the substrate thus coated with such a powder is placed into any suitable oven or the like at a temperature in excess of that required to cause fusion and spreading of the powdery composition and, concomitantly, the cross-linking or curing of the binder. In this manner, a smooth and glossy coating is obtained. It too is known that the ultimate mechanical properties of a coating thus provided are functions of the degree or amount of cross-linking and, accordingly, of the curing time. Hence, to obtain the optimum in mechanical properties, to date it has been required that the known powdered paint compositions be cured over prohibitively long periods of time.

Thus, a great need exists in this art for improved, paint compositions which permit of the attainment of paint coatings having the most desirable mechanical properties, but within the more acceptable periods of time demanded by truly economical industrial processing.

SUMMARY OF THE INVENTION

It has now surprisingly been found that, by simple incorporation into the powder of a certain metallic oxide additive, it is possible to optimize the mechanical properties of a resultant paint coating by curing for a much shorter period of time than the time normally required for the cross-linking of a corresponding paint powder based upon a saturated polyester resin, but sans the additive. The novel paint compositions according to the invention thus permit of more rapid processing on an industrial scale and, accordingly, markedly diminish processing expenses.

Hence, a primary object of this invention is to provide powdery compositions of matter comprised of a saturated polyester resin and a curing or cross-linking agent therefor, and which compositions can be cured at temperatures not in excess of 220° C., while at the same time yielding cross-linked, paint coatings displaying improved mechanical properties vis-vis those properties which can be obtained by heat treating a related composition for a lesser period of time than that normally required for a complete heat cure. It is a salient characteristic of the present invention that the subject compositions of matter include a metal oxide, the valence of the metal of which being either two or in excess of two, in addition to the at least one saturated, cross-linkable polyester resin and the at least one curing agent therefor.

Other objects, features and advantages of the invention will become apparent from the description which follows.

DETAILED DESCRIPTION OF THE INVENTION

The saturated polyester resin component of the subject compositions is well known to the art, and is prepared in known manner by reacting an aromatic dicarboxylic acid or a lower alkyl ester of such aromatic dicarboxylic acid with a diol, in proportions selected as to provide resins having any desired acid and hydroxyl numbers.

Representative of such aromatic dicarboxylic acids, there are mentioned as preferred embodiments terephthalic acid and isophthalic acid, either used alone or in admixture with the saturated, aliphatic dicarboxylic acids, exemplary of which being adipic, succinic and sebacic acids.

Furthermore, in order to increase the amount of branching associated with the polyester, it is possible to use a mixture of the dicarboxylic acids with acids having more than two aromatic or aliphatic carboxylic acid groups, or ester-forming derivatives thereof. Examples of these polyacids are trimellitic acid and anhydride thereof, pyromellitic acid and anhydride thereof and butane tetracarboxylic acid. These latter comonomers are employed in such amounts that the resultant resin is neither infusible nor non-melting.

The diols which typically are used to prepare the polyester component include ethylene glycol, the polyalkylene glycols comprised of ether linkages such as diethylene glycol and dipropylene glycol, butanediols, bis-hydroxyethyl-bisphenol A, neopentyl glycol and hydrogenated bisphenol A. These diols are either used alone or in admixture with each other, or with yet other diols.

In order to increase the amount of branching and the number of hydroxyl end groups in the polyester, it is advisable to combine the foregoing diols with triols and higher polyols, such as glycerol, trimethylolpropane, trihydroxyethylisocyanurate and pentaerythritol.

It is apparent that, if the polyester is to be prevented from premature cross-linking and, thus, infusibility during its preparation, those polyacids and polyols having more than two acid functions or more than two alcohol groups can be used only within those maximum limits prescribed by Flory's law [see, e.g., Turner Alfrey,

*Mechanical Behavior of High Polymers,* volume VI, page 268, Interscience Publishers].

Typically, the saturated polyesters employed in the compositions of the invention are solid masses, with their softening points, as determined by the ball and ring method, ranging between 50° C. and 130° C., and which display hydroxyl numbers between 100 and 200 and have an acid number of less than 10, preferably >5. The compositions according to the invention, moreover, are not limited to but a single saturated polyester resinous component, but may also be comprised of two or more of such saturated polyesters.

The curing or cross-linking agents comprising the subject compositions are compounds having an acid anhydride moiety as well as an acid function which is capable of interreacting with the reactive or functional groups of the saturated polyester resins hereinbefore mentioned. Such curing agents having both acid anhydride and acid functions are typically the products of a reaction between a diol and a compound containing at least one acid anhydride function and at least one carboxylic acid function, or having at least three carboxylic acid functions of which at least two are capable of forming an acid anhydride moiety. Exemplary of such compounds are the products of reaction between, e.g., tricarballylic acid, trimellitic anhydride, pyromellitic dianhydride, butane tetracarboxylic acid, and an aliphatic diol containing from 2 to 10 carbon atoms. These curing agents are also described in the commonly owned U.S. Pat. No. 4,024,111 to Thomas et al, hereby expressly incorporated by reference. In the event that trimellitic anhydride is utilized as a reactant for the preparation of suitable curing agent, the molar ratio of the trimellitic anhydride to the aliphatic diol may vary from 2/1 to 2/1.8. The reaction of the trimellitic anhydride is carried out at a temperature of from 180° to 250° C. until no further water is liberated. The reaction product consists of a mixture of dianhydride having ester functions and of products having acid functions. The softening point of the reaction product falls in the range of between 80° C. and 130° C., and more preferably falls in the range of between 100° C. and 120° C.

The compositions according to the invention contain, in addition to the cross-linkable saturated polyester resin and the curing agent defined above, a metal oxide, the valence of the metal of which being two, and which metal oxide is selected from the group consisting of zinc, magnesium, cadmium, iron(II), and the alkaline earth metal oxides. Preferably, the metal oxide is utilized in its anhydrous form or is dried at a temperature whereby no water evolves therefrom; this metal oxide may possibly be in its hydrated form during cure and advantageously is in the form of a fine powder, preferably having particle sizes of less than 10 microns. The content by weight of the metal oxide with respect to the polyester resin ranges between 0.5% and 5%, and preferably ranges between 0.5% and 2%.

The compositions according to the invention are readily cross-linked by polyaddition and/or polycondensation at temperatures of from 160° and 220° C. for periods of time which vary between 5 and 40 minutes. The ratio by weight of the saturated polyester resin to the curing or cross-linking agent may vary considerably in consideration of the hydroxyl number of the polyester resin and the anhydride and acid equivalents of the curing agent. Usually, the weight ratio is such that there essentially exists an equilibrium in the final composition between the number of reactive functions in the saturated resin and the number of reactive functions in the curing agent.

Powder paint formulations comprising the compositions of the invention typically include the classical additives which are well known to the paint industry, such as the various fillers, pigments, colorants, and the like. Flow control or spreading agents, such as the commonly employed acrylic polymers and silicone oils, too may be included, usually in amounts ranging from between 0.1% and 1% by weight.

The metal oxide component of the subject compositions can be incorporated into the polyester/curing agent binders by any one of a number of means, preferably either by admixing the oxide, under agitation, with the product of the polyester polycondensation reaction, while the same remains in the molten state and at least first prior to take up or casting of such reaction product, or merely by forming a simple mechanical admixture of the several ingredients prior to ultimate mixing and formulation of the composition through fusion and grinding. According to the first embodiment immediately above described, (i) the ground polyester resin having admixed therewith the metal oxide, (ii) the ground curing agent and (iii) the optional various additives therefor are intimately mixed in dry state in a conventional powder mixer, and the mixture next fused in a conventional fusion mixer, e.g., a Banbury or Buss mixer, at a temperature not exceeding 120° C. and preferably either less than or equal to 100° C. The mixture is then cooled and finely ground to particle sizes on the order of 20 to 100 microns, and thence screened. The mixtures thus obtained can then be coated onto any suitable substrate, advantageously one that has previously been degreased and which is heat-resistant, for example, any one of a number of the metal substrates or ceramics. The application itself is by means of such known methods as, e.g., electrostatic deposition or fluidized bed coating; the coatings are next cross-linked at temperatures of from about 150° to 200° C. for from about 5 to 40 minutes. The average thickness of a coating thus obtained on any given support typically falls within the range of from between 30 to 70 microns.

In the second processing embodiment of the invention, the metal oxide is first admixed with the other components of the subject compositions in a powder mixer and then the first procedure above-outlined is simply followed. The compositions according to the invention provide cross-linked coatings having impact resistances, measured in accordance with the French standard NFT 30039, which may be as high as 80 kg/cm.

The compositions according to the invention comprise paint binders for paints finding use in all of the automotive, electrical household goods, agricultural machinery, and lead and other industries.

In order to further illustrate the invention and the advantages thereof, the following specific example is given, it being understood that same is intended only as illustrative and in nowise limitative. In the example which follows all parts are given by weight, unless otherwise indicated.

EXAMPLE

[A] Preparation of the Polyester Resin

A polyester having the molar composition given below was prepared by known technique by reaction of the various components, at 200° C. under a nitrogen atmosphere until the acid and hydroxyl numbers desired were obtained:

| | |
|---|---|
| Terephthalic acid | 1 mole |
| Propylene glycol | 1 mole |
| Trimethylolpropane | 0.33 mole |

The acid number of the product obtained was 5, its hydroxyl number was 160 and its melting point was 85° C. After pouring and cooling the product was finely ground.

[B] Preparation of the Curing Agent

Into a reactor flushed with nitrogen, 576 g (3 moles) of trimellitic anhydride were introduced and heated to 230° C., then 93 g (1.5 mole) of ethylene glycol were gradually added, while maintaining the temperature of the reactor through external cooling. Two hours after termination of the addition, no more water was being evolved. The product was cast, cooled and ground. Acid numbers obtained were the following ($I_A$):

| | |
|---|---|
| $I_A$ in aqueous medium | 518 |
| $I_A$ in alcoholic medium | 336 |

[C] Preparation of the Coating Composition

In a powder mixer, the following were placed and homogenized:

| | |
|---|---|
| Polyester according to [A] | 100 parts |
| Curing agent according to [B] | 40 parts |
| Zinc oxide | 1 part |
| (snow Codex grade) | |
| Rutile Kronos CL 220 | 50 parts |
| (marketed by Societe Industrielle du Titane) | |
| Flow Control Agent | 1 part |
| (Modaflow by Monsanto) | |

The mixture was extruded in a Buss mixer at a temperature less than 100° C. and the extrusion ground and screened on a screen with a 100 micron mesh.

[D] Preparation of the Coating

The powder obtained was applied with the aid of an electrostatic sprayer (Sames) to a steel plate (previously degreased) having dimensions of 20 cm×10 cm×0.08 cm to obtain a coating having a thickness of 50 microns. The plate was then baked at 200° C. for 12 minutes. Following cooling, impact resistance was measured by the standard NFT 30039. An impact strength of 80 to 100 kg/cm was regularly attained. For purposes of comparison, an identical composition but without the zinc oxide yielded a coating having an impact strength, after curing for 12 minutes at 200° C., of less than 20 kg/cm. For a curing time of 30 minutes, 50 to 60 kg/cm were obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A thermosetting composition of matter comprising (i) a cross-linkable, saturated, hydroxylated polyester resin, (ii) a cross-linking agent for the polyester (i), said cross-linking agent being a compound comprised of both a carboxylic acid anhydride moiety and a carboxylic acid function, and (iii) a metallic oxide, the metal cation of which oxide is selected from the group consisting of zinc, magnesium, cadmium, iron (II) and alkaline earth in an amount between about 0.5% and 5% by weight metal with respect to the weight of the polyester resin.

2. The composition of matter as defined by claim 1, wherein the polyester resin (i) is a solid, having a softening point between about 50° C. and 130° C., having an acid number of less than about 10, and having a hydroxyl number of between about 100 and 200.

3. The composition of matter as defined by claim 1, further including a member selected from the group consisting of filler, pigment, colorant, flow control agent, and mixtures thereof.

4. The composition of matter as defined by claim 2, wherein the polyester resin comprises the reaction product of an aromatic dicarboxylic acid, or ester-forming derivative thereof, and a diol.

5. The composition of matter as defined by claim 4, wherein the aromatic dicarboxylic acid is selected from the group consisting of terephthalic acid and isophthalic acid.

6. The composition of matter as defined by claim 5, wherein the diol is selected from the group consisting of ethylene glycol, polyalkylene glycol, butanediol, bishydroxyethyl-bisphenol A, neopentyl glycol and hydrogenated bisphenol A.

7. The composition of matter as defined by claim 6, further including a member selected from the group consisting of an aromatic polycarboxylic acid having in excess of two carboxylic acid functions, an aliphatic polycarboxylic acid having in excess of two carboxylic acid functions, and the ester-forming derivatives thereof.

8. The composition of matter as defined by claim 7, wherein such polycarboxylic acids are selected from the group consisting of trimellitic acid and anhydride thereof, pyromellitic acid and anhydride thereof, and butane tetracarboxylic acid.

9. The composition of matter as defined by claim 6, further comprising a saturated, aliphatic dicarboxylic acid.

10. The composition of matter as defined by claim 9, wherein the saturated, aliphatic dicarboxylic acid is selected from the group consisting of adipic acid, succinic acid and sebacic acid.

11. The composition of matter as defined by claim 6, further comprising an at least triol.

12. The composition of matter as defined by claim 11, wherein said at least triol is selected from the group consisting of glycerol, trimethylolpropane, trihydroxyethylisocyanurate and pentaerythritol.

13. The composition of matter as defined by claim 2, wherein said cross-linking agent is the product of reaction between a diol and a member selected from the group consisting of a compound comprising at least one carboxylic acid anhydride function and at least one carboxylic acid function, and a compound comprising at least three carboxylic acid functions, at least two of which functions being convertible into a carboxylic acid anhydride moiety.

14. The composition of matter as defined by claim 13, said cross-linking agent being the product of reaction an aliphatic diol containing from 2 to 10 carbon atoms and a member selected from the group consisting of tricarballylic acid, trimellitic anhydride, pyromellitic dianhydride, and butane tetracarboxylic acid.

15. The composition of matter as defined by claim 14, said member being trimellitic anhydride, and the molar ratio of said trimellitic anhydride to the diol ranging from 2:1 to 2:1.8.

16. The composition of matter as defined by claim 1, wherein the metal oxide is finely powdered.

17. The composition of matter as defined by claim 16, wherein the metal oxide is finely powdered to a particle size of less than 10 microns.

18. The composition of matter as defined by claim 1, wherein the amount of metal oxide ranging between about 0.5% and 2% by weight.

19. The composition of matter as defined by claim 1, wherein the weight ratio of polyester to cross-linking agent is such that the total number of reactive functions in the polyester is substantially the same as the total number of reactive functions in the cross-linking agent.

20. The composition of matter as defined by claim 1, wherein said metal oxide is zinc oxide.

21. A process for the formulation of the compositions of matter as defined by claim 1, comprising physically admixing the three components in dry state, next homogenizing and fusing the resulting admixture at a temperature less than 120° C., and thence cooling and grinding the product of fusion.

22. The process as defined by claim 21, wherein the fusion is at a temperature of less than 100° C., the product is ground to particle sizes of between 20 to 100 microns, and the ground product screened.

23. A coating comprising the composition of matter as defined by claim 1.

24. The coating as defined by claim 23 which comprises a powder paint.

25. A cross-linked polymeric matrix including a dispersed metal oxide phase, comprising the autoreaction product of the composition of matter as defined by claim 1.

26. A coated substrate, the coating comprising the cross-linked polymeric matrix and dispersed phase as defined by claim 25.

27. The coated substrate as defined by claim 26, the coating comprising a paint.

28. The coated substrate as defined by claim 27, the substrate coated being selected from the group consisting of a metal and a ceramic.

29. The composition of matter as defined by claim 2, said polyester resin having an acid number of less than or equal to 5.

* * * * *